US009764466B2

(12) United States Patent
Rey et al.

(10) Patent No.: US 9,764,466 B2
(45) Date of Patent: Sep. 19, 2017

(54) HEXAPOD SYSTEM

(71) Applicant: COMMISSARIAT A L'ENERGIE ATOMIQUE ET AUX ENERGIES ALTERNATIVES, Paris (FR)

(72) Inventors: Frédéric Rey, Pierrevert (FR); Slim Alouani, Aix en Provence (FR)

(73) Assignee: Commissariat A L'Energie Atomique Et Aux Energies Alternatives, Paris (FR)

(*) Notice: Subject to any disclaimer, the term of this patent is extended or adjusted under 35 U.S.C. 154(b) by 14 days.

(21) Appl. No.: 14/442,909

(22) PCT Filed: Nov. 12, 2013

(86) PCT No.: PCT/EP2013/073618
§ 371 (c)(1),
(2) Date: Oct. 6, 2015

(87) PCT Pub. No.: WO2014/076079
PCT Pub. Date: May 22, 2014

(65) Prior Publication Data
US 2016/0031080 A1 Feb. 4, 2016

(30) Foreign Application Priority Data

Nov. 14, 2012 (FR) .................................. 12 60851

(51) Int. Cl.
*B25J 17/00* (2006.01)
*B25J 9/14* (2006.01)
(Continued)

(52) U.S. Cl.
CPC .............. *B25J 9/144* (2013.01); *B25J 9/0057* (2013.01); *B25J 9/0075* (2013.01); *B25J 9/06* (2013.01);
(Continued)

(58) Field of Classification Search
CPC ... B25J 9/06; B25J 9/065; B25J 9/1623; B25J 17/0216; B25J 9/144; B25J 9/0057; B25J 9/0075; B25J 9/08; B25J 19/0091
See application file for complete search history.

(56) References Cited

U.S. PATENT DOCUMENTS 4,393,728 A * 7/1983 Larson ................. B05B 15/061
248/160
4,784,042 A * 11/1988 Paynter .................... B25J 9/142
414/7
(Continued)

FOREIGN PATENT DOCUMENTS

FR      2565882      12/1985

OTHER PUBLICATIONS

PCT/ISA/237 Written Opinion issued on PCT/EP2013/073618, pp. 6.
PCT/IPEA/409 Preliminary Report on Patentability, pp. 5.

*Primary Examiner* — Zakaria Elahmadi
(74) *Attorney, Agent, or Firm* — The Farrell Law Firm, P.C.

(57) ABSTRACT

Disclosed is a hexapod system including first and second supports and six linear actuators. Each linear actuator has an articulated end on the first and second supports, with a swivel connection with a force-absorbing structure embedded in the first support and a swivel connection to linear actuators articulated on the first support, and one of the first and second supports includes a connector that cooperates with the force-absorbing structure. The connector cooperates with a second force-absorbing structure of a second hexapod system, and the two hexapod systems mount in series.

18 Claims, 7 Drawing Sheets

(51) Int. Cl.
  *B25J 9/00*   (2006.01)
  *B25J 17/02*  (2006.01)
  *B25J 9/06*   (2006.01)
  *B25J 9/08*   (2006.01)
  *B25J 19/00*  (2006.01)

(52) U.S. Cl.
  CPC ............. *B25J 9/08* (2013.01); *B25J 17/0216* (2013.01); *B25J 19/0091* (2013.01); *Y10S 901/22* (2013.01); *Y10S 901/28* (2013.01)

(56) References Cited

U.S. PATENT DOCUMENTS

| | | | |
|---|---|---|---|
| 4,848,179 A | | 7/1989 | Ubhayakar |
| 5,383,738 A | * | 1/1995 | Herbermann ............... B25J 9/06 248/288.51 |
| 5,568,993 A | * | 10/1996 | Potzick ................ B23Q 1/5462 403/128 |
| 7,798,036 B2 | * | 9/2010 | Okazaki ................ B25J 9/1075 74/490.05 |
| 2009/0314119 A1 | * | 12/2009 | Knoll ................ A61B 1/00156 74/490.01 |
| 2010/0313695 A1 | * | 12/2010 | Valasek ................ B23Q 1/545 74/490.08 |
| 2012/0048156 A1 | | 3/2012 | Zhang et al. |
| 2012/0103128 A1 | * | 5/2012 | Long ...................... B25J 9/0057 74/490.08 |
| 2013/0164107 A1 | * | 6/2013 | Pehlivan ............... B25J 17/0266 414/732 |

* cited by examiner

HEXAPOD SYSTEM

TECHNICAL FIELD OF THE INVENTION

The invention concerns the field of robotics and more particularly that of robots comprising hexapod systems. The non-limitative but particularly advantageous application thereof is the field of the inspection and repair of nuclear reactors.

PRIOR ART

In certain fields such as the nuclear field for example, the use of ever more precise and robust robots is more and more important. This is because, in an increasing desire to improve the safety of nuclear reactors, recourse to robots appears to be particularly attractive for carrying out inspection and/or repair tasks whilst the reactor is in service (these tasks are usually referred to as ISIR, standing for "In Service Inspection and Repair". These robots can also work on installation-dismantling sites (mainly nuclear dismantling) and also during nuclear accidents and more generally industrial accidents making it impossible to access zones where it is necessary to work except by causing a high risk for human operators.

Typically, these robots must be capable of incorporating sensors, and tools for measuring and repairing in a nuclear unit and more precisely in immersion in the sodium of the vessel of a fast neutron reactor with sodium coolant.

The robots currently used are generally mounted on a pole manipulated from the outside of the main vessel of the reactor. The main accesses to the inside of this vessel are situated on the floor. Inspection or repair mechanisms can be introduced through these accesses. These solutions are satisfactory overall when the zones to be inspected are easy to access. There had never up to the present time been a requirement to access the deepest immersed parts of this type of reactor. Because of changes in regulations, the Nuclear Safety Authority now requires that it be possible to inspect all or part of these zones. The means employed up until now do not allow this.

The increasing requirements in terms of safety therefore require that, during ISIR tasks, the robots must access zones that are difficult to access in the reactor unit. Furthermore, these zones that are difficult to access may sometimes be situated at a relatively great distance from the point where the robot enters the reactor.

The known solutions involving poles do not make it possible to position the robot in zones that are difficult to access and are therefore not suited to the stringent requirements in terms of ISIR.

Moreover, some reactors impose a particularly constraining environment on the robots. Such is the case with reactors with 4th-generation coolants. In particular in this type of reactor, the coolant is generally sodium. This metal is chemically highly reactive. In addition, like water, sodium would exert a significant hydrostatic pressure on any robot that would be immersed. Furthermore the temperature of the coolant remains relatively high in order to maintain it in the liquid state and to satisfy the requirements with respect to limitation of thermal fatigue of the internal structures of the main vessel. The ASTRID (Advanced Sodium Technological Reactor for Industrial Demonstration) reactor constitutes an example of this type of reactor.

These stringent constraints make solutions based on pivot articulations mounted in series unsatisfactory. This type of solution does not in fact prove to be sufficiently robust in constraining environments such as sodium-coolant reactors or has excessively low load capacities.

Moreover, articulations based on hexapods do not offer a sufficient load capacity when the force to be generated by the articulation, typically the movement of a mass disposed on a top plate of the hexapod, is not perpendicular to this plate. This is because a shearing force is inevitably caused by this force. This shearing force must be absorbed by the linear actuators, which at best reduces their load capacity and at worse causes a rupture of the articulation. This type of solution is therefore also not satisfactory.

There therefore exists a need consisting of proposing an articulation for a robot that is precise and robust and forms a good load capacity whatever the orientation of this load. The object of the present invention is to propose a solution that meets this requirement.

The other objects, features and advantages of the present invention will emerge from examination of the following description and the accompanying drawings. Naturally other advantages may be incorporated.

SUMMARY OF THE INVENTION

To achieve this objective, the present invention proposes, according to one embodiment, a hexapod system for a robot comprising a first and second support and six linear actuators, each linear actuator having two ends articulated respectively at the first and second support by means of a swivel connection. The hexapod system comprises: a force-absorbing structure on one hand embedded on the first support and on another hand coupled to the second support by a swivel connection. Preferably and particularly advantageously, the centre of rotation of this swivel connection coupling the force-absorbing structure is situated in the thickness of the second support.

Thus the system effectively absorbs the shearing forces applied to the second support while preserving mobility of the second support with respect to the first support in at least two degrees of freedom in rotation. The positioning of the centre of rotation of the swivel also makes it possible to eliminate the lever arm between the swivel and second support and therefore to reduce the forces unnecessarily exerted on the linear actuators. By virtue of the present invention, said actuators are therefore acted on only to produce the forces necessary for the required movement. At an equivalent capacity of deployment of forces perpendicular to the second support, the absorption of the shearing forces by the force-absorbing structure makes it possible to reduce the weight and size of the hexapod according to the invention compared with a hexapod of the prior art. The articulation formed by the hexapod of the invention therefore offers an improved load capacity while being precise and robust and having limited size.

According to another embodiment, the invention relates to a robot, for example for inspection and/or repair, characterised in that it comprises an arm equipped with at least one and preferably a plurality of articulations mounted in series and each comprising a first and second support and at least three and preferably six linear actuators. Each linear actuator has two ends articulated respectively on the first and second support by means of a swivel connection. Each articulation also comprises a force-absorbing structure on one hand embedded on the first support and on another hand coupled to the second support by means of a swivel connection. Preferably and particularly advantageously, the centre of rotation of this swivel connection is situated in the thickness of the second support.

The invention thus makes it possible to produce a robot comprising a polyarticulated arm in which the shearing force caused by the weight of the various hexapod systems is absorbed mainly by the force-absorbing structure. A robot equipped with an articulation according to the invention thus has an increased load capacity while affording good dexterity. The robotic arm may thus have a relatively great length while having reduced size. It may therefore be used for accessing zones that are difficult to access and for operations requiring a high load capacity.

Advantageously, this robot is an inspection and/or repair robot configured to perform inspections of nuclear power stations. It can also be used for dismantling or work operations in a hostile environment.

According to an advantageous but non-limitative embodiment, the robot comprises an arm equipped with a plurality of articulations disposed in series. Advantageously, each articulation forms a hexapod provided with the force-absorbing structure. Advantageously, two juxtaposed hexapod systems share the same support.

BRIEF DESCRIPTION OF THE FIGURES

The aims, objects, features and advantages of the invention will emerge more clearly from the detailed description of an embodiment thereof that is illustrated by the following accompanying drawings, in which.

Figure 1:
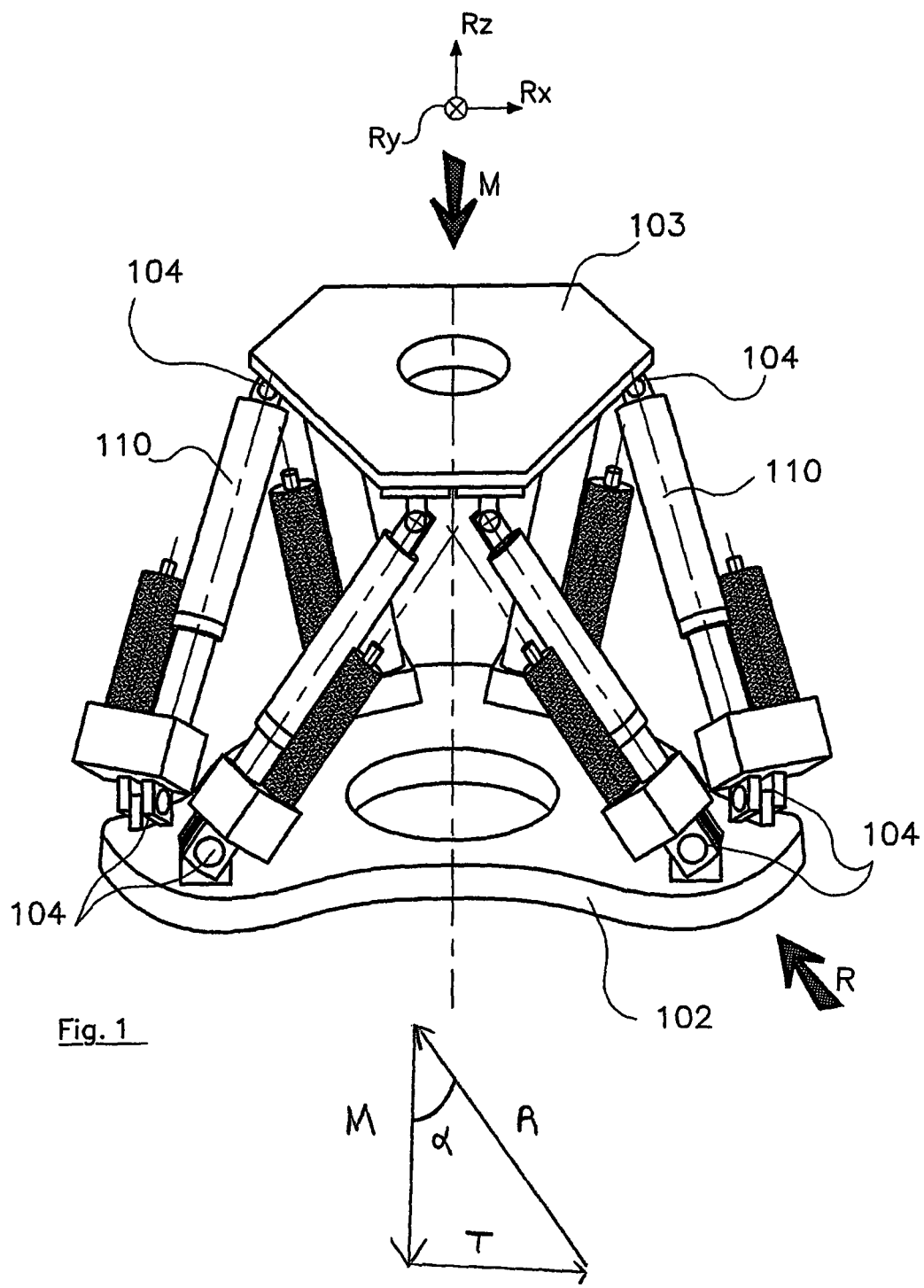
FIG. 1 is a diagram illustrating a hexapod according to the prior art subjected to a force substantially perpendicular to the plates. This figure also illustrates the balance of forces involved on the actuator in this loading case.

The drawings are given by way of examples and are not limitative of the invention. They constitute outline schematic representations intended to facilitate understanding of the invention and are not necessarily to the scale of practical applications. In particular, the relative dimensions of the various elements do not represent reality.

DETAILED DESCRIPTION OF THE INVENTION

Before beginning a detailed review of embodiments of the invention, optional features, which may optionally be used in association or alternatively, are stated below:

Advantageously, the centre of rotation of the swivel connection articulating the force-absorbing structure on the second support is situated between two planes intersecting the second support, said two planes being parallel to each other and parallel to a plane defined by two rotation axes $R_x$, $R_y$ perpendicular to each other and about which the second support is rotated with respect to the first support while keeping the first support fixed. The axis $R_z$ is the axis of any inherent rotation of the second support, that is to say the rotation of the second support on itself. The force-absorbing structure extends in a principal direction. Typically, the direction $R_z$ is the principal direction in which the force-absorbing structure. The direction $R_z$ is defined by the straight line passing through the embedding connection and the centre of rotation of the swivel connection coupling the force-absorbing structure on the second support. This direction is therefore fixed whatever the deployment of the linear actuators.

Advantageously, the centres of the swivel connections by means of which the linear actuators are articulated on the first support are coplanar. The plane defined by the centre of the swivel connections by means of which the linear actuators are articulated on the first support is parallel to two planes, parallel to each other, passing through the second support and between which the centre of rotation of the swivel connection coupling the force-absorbing structure on the second support is situated.

The contour of the second support defines an external envelope and said centre of rotation of the swivel connection formed by the second support and the force-absorbing structure is situated inside this envelope.

The centre of rotation of the swivel connection is ideally located in the mid-plane of the second support.

Preferably, the second support has an internal face turned towards the force-absorbing structure and an external face opposite to the internal face and in which the centre of rotation is situated between the internal and external faces, ideally in a plane median to these two faces.

Preferably, the centre of rotation of the swivel connection coupling the force-absorbing structure of the second support is situated at equal distances from the external face and the internal face of the second support, that is to say at the middle of the thickness of the second support.

According to a non-limitative embodiment, the internal face and the external face are planar.

Preferably, the linear actuators and the absorbing structure provide by themselves alone the mechanical articulation between the first and second supports. There are therefore no other elements provided for moving or retaining the two supports with respect to each other.

According to a non-limitative embodiment, the force-absorbing structure is a connecting arm, a first end of which is embedded on the first support and the second end of which is coupled to the second support by a swivel connection. Preferably, the force-absorbing structure is a tube.

According to one embodiment, the invention provides an articulation based on an articulation of the Stewart platform type and integrating other features such as a structure for absorbing shearing forces.

The linear actuators are retractable arms. The linear actuators are for example hydraulic jacks, pneumatic jacks or screw jacks, etc.

The linear actuators do not comprise a pivot or swivel connection other than the swivel connection allowing coupling thereof to the first and second supports. A linear actuator, taken in isolation, is therefore able to move solely in translation and optionally in rotation about its translation axis.

The first support is rigid. It does not comprise any articulation other than those with external elements to which it is connected (actuators, force-absorbing structure for example). Likewise, the second support is rigid. It does not comprise any articulation other than the one with external elements to which it is connected.

Advantageously, said centre of rotation of the swivel connection formed by the second support and the force-absorbing structure is situated at the centre of its circle formed by the swivel connections by means of which the linear actuators are articulated on the second support.

Advantageously, the force-absorbing structure is embedded on the first support at the centre of a circle formed by the swivel connections by means of which the linear actuators are articulated on the first support.

Advantageously, the swivel connections by means of which the linear actuators are articulated on the first support each have a centre of rotation that is situated in the thickness of the first support. Thus the centre of rotation of the swivel connections coupling the actuators to the first support is situated between two planes passing through the first support, said two planes being parallel to each other and parallel to a plane defined by two rotation axes Rx, Ry perpendicular to each other and about which the second support is rotated with respect to the first support while keeping the first support fixed. Preferably, the centre of rotation of the swivel connections coupling the actuators to the first support is situated between two planes passing through the first support, said two planes being parallel to each other and perpendicular to the axis Rz passing on one hand through the embedding connection between the force-absorbing structure and the first support and passing on another hand through the centre of the swivel connection coupling the force-absorbing structure to the second support. Advantageously, the lever arm between the swivel connection and the first swivel connections and the first support is reduced, thereby limiting the forces generated on the first support and the swivels.

Advantageously, the swivel connections by means of which the linear actuators are articulated on the second support have a centre of rotation that is situated in the thickness of the second support. Advantageously, the lever arm between the swivel connections and second support is reduced, thereby limiting the forces generated on the second support and the swivels.

According to a non-limitative embodiment, at least one from among the first and second supports forms a plate. Thus the centre of rotation of the swivel coupling the force-absorbing structure to the second plate lies in the thickness $e_2$ of the plate. The thickness $e_2$ can be defined by a dimension between two points on the second support taken in a direction parallel to the principal direction along which the force-absorbing structure extends. Advantageously, the distance between an external or internal face of the second support and the centre of the swivel connection coupling the force-absorbing structure to the second support is equal to $e_2/2$.

According to a non-limitative embodiment, at least one support taken from among the first and second supports of the hexapod system comprises a connector configured so as to cooperate with one end of a force-absorbing structure so as to form respectively an embedding and a swivel connection.

Advantageously, the connector is also configured so as to cooperate with an additional force-absorbing structure so as to form: a connection embedded with one from among the force-absorbing structure and the additional force-absorbing structure; a swivel connection with the other one from among the force-absorbing structure and the additional force-absorbing structure. Thus the same connector is common to two articulations.

According to one embodiment, at least one from among the first and second supports comprises a connector configured so as to cooperate with said force-absorbing structure so as to form together said embedding or respectively said swivel connection, the connector further being configured so as to cooperate with a second force-absorbing structure of a second hexapod system, the two hexapod systems being mounted in series, so as to form with this second force-absorbing structure a swivel connection or respectively an embedding, the same connector thus cooperating with the force-absorbing structures of two hexapod systems mounted in series. Thus the first support comprises a connector configured so as to cooperate with said force-absorbing structure coupled to the first support by an embedding connection so as to form said embedding connection, the first connector also being configured so as to cooperate with a second force-absorbing structure of another hexapod system so as to form with this other force-absorbing structure a swivel connection, the same connector thus cooperating simultaneously with the force-absorbing structures of two hexapods mounted in series. Likewise the second support comprises a connector configured so as to cooperate with said force-absorbing structure coupled with a second support by a swivel connection so as to form said swivel connection, the second connector also being configured so as to cooperate with another force-absorbing structure of another hexapod system so as to form with this other force-absorbing structure an embedded connection, the same connector thus cooperating simultaneously with the force-absorbing structures of two hexapods mounted in series. Thus the assembly and repair of the articulated arm comprising multiple hexapod systems are facilitated.

According to one embodiment the connector forms a single piece.

According to one embodiment, the force-absorbing structures of two hexapod systems are secured to the supports by the connectors only.

According to one embodiment, the support comprising the connector is common to the two hexapod systems mounted in series.

According to one embodiment, the actuators of two hexapod systems are articulated for rotation on the common support.

According to one embodiment, the common support forms a single piece.

According to one embodiment, the force-absorbing structure has a first end at which the force-absorbing structure is embedded on the second support and a second end at which the force-absorbing structure is coupled to the second support by a swivel and in which the first and second ends of the force-absorbing structure are secured. Thus a rigid connection connects the first and second ends. The latter are not articulated.

According to one embodiment, the force-absorbing structure extends from one support to the other of the same articulation.

According to one embodiment, the force-absorbing structure extends in a principal direction perpendicular to the plane in which each support extends. The force-absorbing structure extends substantially linearly.

According to one embodiment, each hexapod system comprises a single force-absorbing structure.

According to one embodiment, the force-absorbing structure comprises a hollow tube carrying a hollow swivel. The connector is hollow at its centre. The system is configured so as to form a passage channel passing through the force-absorbing structure and the first and second supports. The passage channel passes through the centre of the supports. The polyarticulated arm equipped with a plurality of hexapod systems comprises at least one cable and at least one pipe passing through the passage channel of each of the hexapod systems. The passage channels of each of the hexapod systems of the arm form a continuous passage channel.

According to another embodiment, the system relates to a robot comprising a polyarticulated arm equipped with a plurality of hexapod systems comprising only one or a combination of the features mentioned above and in which the hexapod systems are mounted in series.

According to a non-limitative embodiment, the robot is an inspection and/or repair robot configured so as to perform inspections of nuclear power stations.

According to a non-limitative embodiment, the robot is a robot for dismantling and/or working in a hostile environment.

According to one embodiment, the polyarticulated arm comprises at least three hexapod systems mounted in series in order to allow movements of the arm on at least two rotation axes. The invention thus proposes a polyarticulated arm with improved robustness and load capacity and with a movement capability on at least two degrees of freedom in rotation by articulation.

According to an advantageous embodiment, the articulated arm comprises a fluidtight deformable sheath enveloping at least a plurality of articulations. The sheath is conformed so as to follow the movement of the polyarticulated arm and to be held at a distance from the linear actuators and the swivel connections whatever the movement of the polyarticulated arm.

Thus the invention proposes a robotic arm having at least two degrees of freedom in rotation by articulation on two axes perpendicular to the principal direction along which the arm extends. It has turned out that the fluidtight sheath has a resistance to wear and a service life much superior to the sheaths enveloping the robotic arms of the known solutions described in the section relating to the prior art.

In the context of the development of the present invention, it has been observed that, in the known solutions, the centres of the rotations are situated inside the sheath, which gives rise to very small radii of curvature and therefore concentrates the stresses on small areas of the sheath. As rotations are generated by the articulations, the fatigue on these areas increases very rapidly and ruptures appear. With the robotic arm according to the invention, the centres of rotation of each articulation are pushed to the outside of the sheath or at least outside the articulation.

The stresses applied to the sheath are therefore distributed more evenly along its length. The areas of high fatigue are then limited or even eliminated. The fatigue strength and the service life of the sheath are then improved.

The invention thus offers a reliable, robust and simple solution for improving the protection of the articulations with respect to the surrounding environment in which they operate.

Furthermore, this solution has the advantage of preventing contact of the sodium with the mechanism of the robotic arm. This considerably limits the possible areas of retention of sodium and reduces the difficulty relating to cleaning and decontamination of the robotic arm. This is particularly useful when the arm has finished its work in the vessel and has emerged therefrom. It must then be cleaned or even serviced and maintained, and this is facilitated by the limited presence of sodium.

The invention affords a particularly effective solution for forming polyarticulated arms intended for ISIR tasks in nuclear reactors. It is particularly advantageous in 4th-generation sodium coolant reactors.

According to an advantageous embodiment, the sheath is preferably conformed so as to be held at a distance from the linear actuators and swivel connections whatever the movement of the articulated arm. Thus, even when an external pressure is applied to the sheath, for example a pressure at one point applied to the external envelope of the sheath or for example a pressure from the external environment to the sheath, the latter is kept at a distance from the actuators of the articulations. There is therefore no contact between the sheath and the swivels coupling the linear actuators to the support or between the sheath and a jack or its rod forming the actuator.

According to an advantageous embodiment, the sheath preferably has a volume that cannot be modified substantially by the effect of an external pressure, such as for example the pressure related to immersion in a liquid or by pressure at one point. Thus, even if the arm is immersed in a liquid or is disposed in a pressurised fluid, the sheath keeps a volume that is fixed by geometric considerations and is not influenced by the pressure. Preferably, the volume of the sheath is constant.

Advantageously, this prevents the sheath, under the effect of pressure, coming into contact with the articulations, which could tear it or damage the linear actuators.

Furthermore, and also advantageously, this makes it possible to increase the Archimede buoyancy exerted on the arm, with respect to a solution resting on a compressible sheath. The Archimede buoyancy is opposed to the weight of the arm. The latter can therefore have a higher mass, for example by being more elongate than an arm with a deformable sheath or than an arm without a sheath, without having to provide a structure or mechanical reinforcement for compensating for this increase in mass. The manoeuverability and/or the external load capacity of the arm are therefore significantly improved.

Preferably, the sheath envelopes all the articulations, optionally with the exception of the end articulations of the articulated arm.

Advantageously, the volume of the sheath remains constant or does not vary by more than 10% or preferably does not vary by more than 5% when it is subjected to a pressure of less than or equal to 10 bar, preferably less than or equal to 5 bar.

Preferably, the sheath is a corrugated tube, also referred to as a bellows tube.

Preferably, the sheath is produced from a material taken from among the grades of stainless steel, titanium, carbon, copper, polymers including silicone, or a combination of these materials.

According to an advantageous embodiment, the first and second supports are conformed so as to keep the sheath at a distance from at least one linear actuator.

According to one advantageous embodiment, the arm comprises a support structure configured so as to hold the sheath at a distance from at least one linear actuator. According to another advantageous embodiment, the sheath is held at a distance from at least one linear actuator by the pressure prevailing inside the sheath. The articulated arm comprises a gas enclosed inside the sheath. Thus the articulated arm comprises a gas enclosed inside the sheath.

According to an advantageous embodiment, the arm is configured so as to hold the sheath at a distance from the linear actuators and the supports, that is to say also the articulations.

According to an advantageous embodiment, the sheath comprises, in addition to the articulations, a fluid. Preferably, the fluid is lighter than the fluid in which the arm is intended to move. For example, the fluid inside the sheath is a gas, such as air, and the arm is immersed in a liquid, such as water or sodium. The gas is enclosed in the sheath. It cannot therefore escape therefrom.

Preferably, the sheath is in a single piece. Alternatively, the sheath comprises a fluidtight envelope supported by a support structure.

According to one embodiment, each force-absorbing structure comprises a hollow tube carrying a hollow swivel. Each connector is hollow at its centre and each hexapod system is configured so as to form a passage channel. The robot also comprises at least one cable or at least one pipe passing through all the hexapod systems, passing through their passage channel.

In the context of the present invention, it has been envisaged having recourse to at least one hexapod system, also referred to as a hexapod, in order to form a robot articulation.

Figure 2:
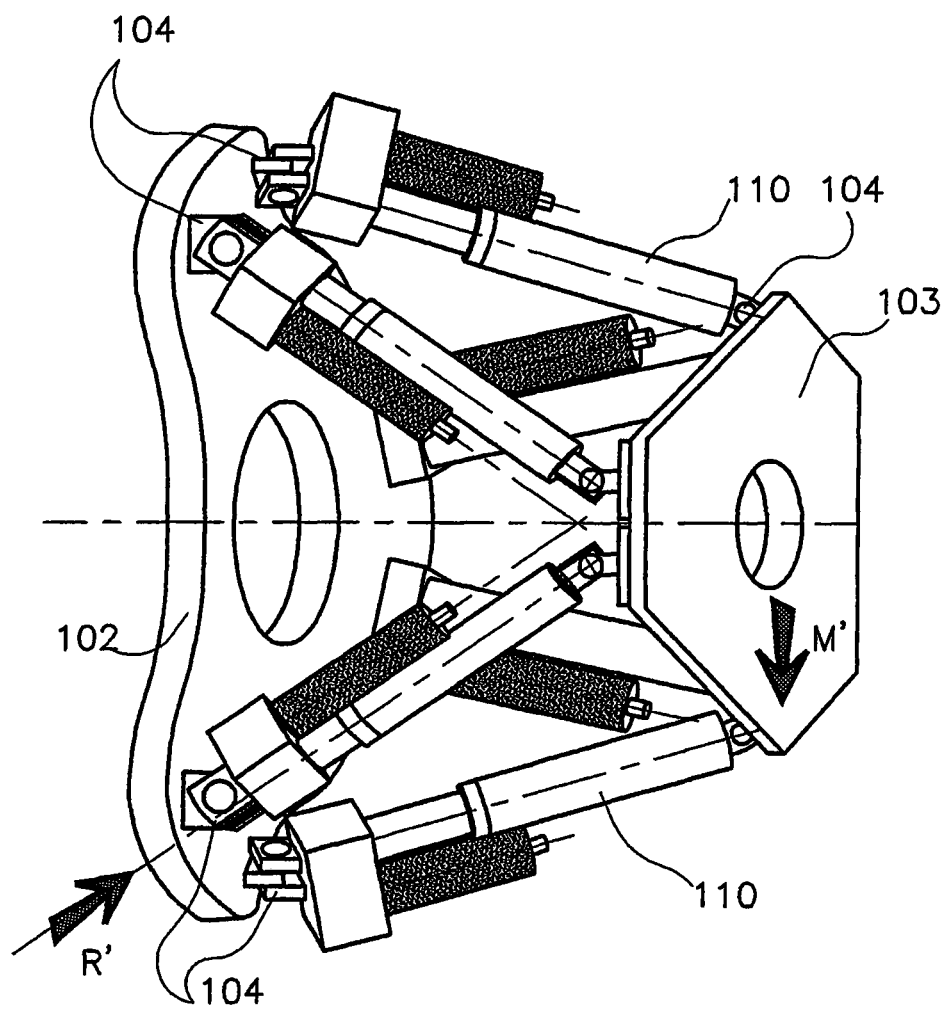
FIG. 2 is a diagram illustrating a hexapod according to the prior art subjected to a force substantially parallel to the plates. This figure also illustrates the balance of forces involved on an actuator in this loading case.

A known hexapod system is illustrated in FIGS. 1 and 2. Its features as well as its drawbacks, as observed in the context of the development of the present invention, will now be described. As illustrated in these figures, a hexapod system is a mechatronic device having a bottom plate 102 and a top plate 103, parallel and mutually connected by three pairs of retractable arms 110. Each arm is articulated with respect to each of the two plates by a swivel connection 104. The deployment or retraction of the arms 110 moves the top plate 103 with respect to the bottom plate 102 according to six degrees of freedom, i.e. three degrees in translation and three degrees in rotation.

Hexapods are very effective when it is the case of moving masses supported on the top plate 103 and for which the weight is exerted perpendicular to the plates. The weight of a mass or a force applied perpendicular to the top plate 103 is represented by the vector denoted M on the balance of forces in FIG. 1. In reaction to this external force, each jack deploys a reaction force along the work axis of the jack. This reaction force deployed by an actuator is illustrated by the vector denoted R in FIG. 1. For reasons of clarity, only one reaction force is illustrated on the diagram in FIG. 1. In reality, the force illustrated by the vector is distributed over the six jacks.

The angle α between the vector M and the vector R is small. The amplitude of the force deployed by the jack is $R=M/\cos(\alpha)$ (considering, for reasons of clarity, that only one of the jacks is absorbing the load).

In the case where a hexapod is subjected to a transverse force, that is to say one substantially parallel to the top plate, then the projected component of this transverse force is exerted detrimentally on each jack 110.

This is illustrated by FIG. 2, in which the external force applied to the second plate is denoted M'. The forces M and M', illustrated in FIGS. 1 and 2, have the same intensity, only their direction being different. The angle α' between the reaction force R' of the jack and the vector M' is larger than the angle α between the reaction force R of the jack and the vector M. The shearing force T' is then very much greater than the shearing force T. This gives:

$$\alpha' = \Pi/2 - \alpha$$

$$R' = M/\cos(\alpha') = M/\cos(\Pi/2 - \alpha);$$

$$R = M/\cos(\alpha);$$

$$\cos(\Pi/2 - \alpha) > \cos(\alpha)$$

The intensity of the force R' must therefore be very much greater than the intensity of the force R for forces M and M' of the same intensity.

Figure 3:
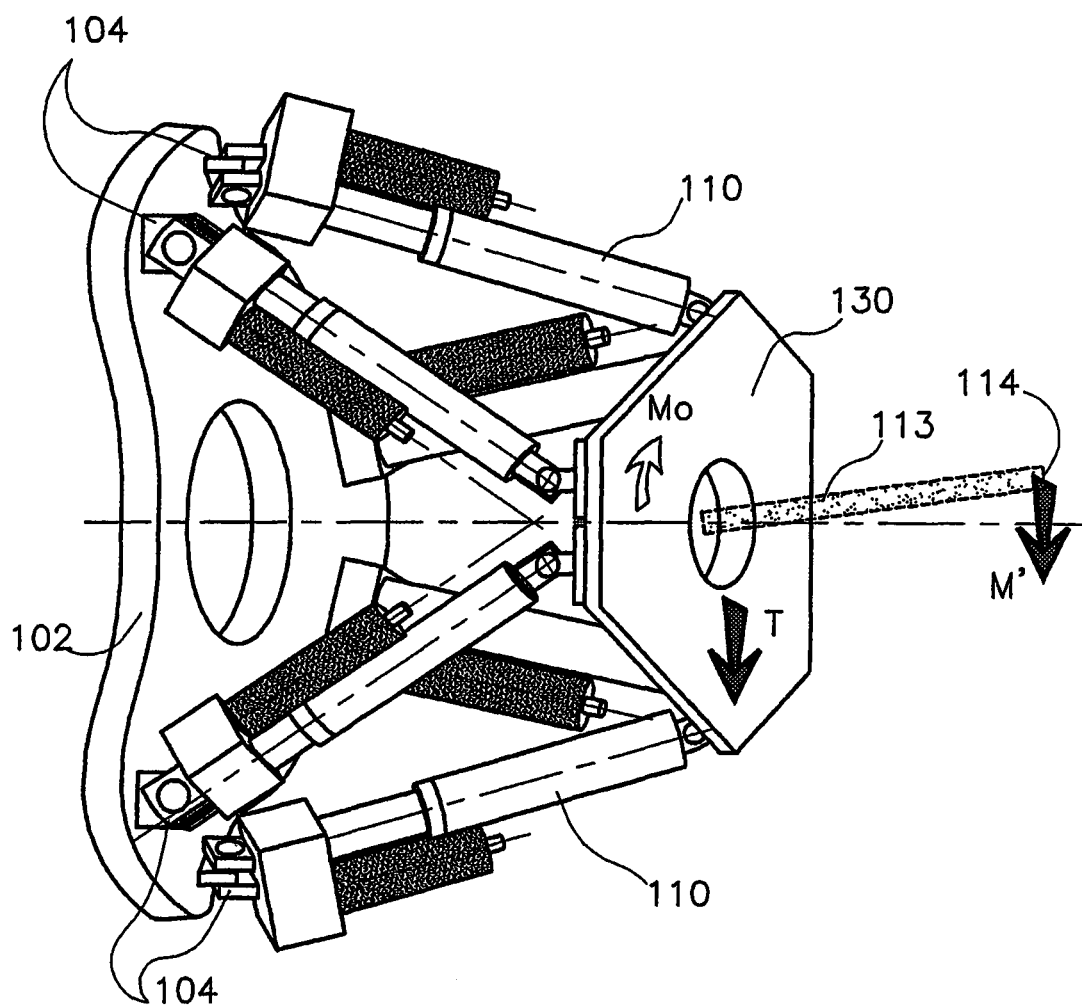
FIG. 3 is a diagram illustrating a hexapod according to the prior art subjected to a force substantially parallel to the plates and applied at a point offset from the top plate.

This problem is even more important when the force M' is not exerted in the plane of the top plate 103, as illustrated in FIG. 2, but when it is offset from the latter. This is because the lever arm 113 between the point 114 of application of the offset force M' and the top plate 103 generates a considerable shearing force T as well as a moment Mo. This is illustrated in FIG. 3.

Part of the force generated by the arms 110 therefore serves only to compensate for the shearing force T'.

Thus a hexapod sized so as to absorb the load M is often incapable of absorbing the load M'. In the best of cases, the force generated by the jacks to compensate for the shearing force T' very significantly reduces the force that the jacks can generate in order to move the top plate 103 in rotations Rx and Ry of axes parallel to the first plate 102. Rotation axes Rx and Ry are illustrated in FIG. 1, the rotation axis Rz being the natural rotation axis of the plate 103.

One solution would consist of oversizing the hexapod so that it can absorb the loads exerted perpendicular and parallel to the plates. This solution would however have the drawback of making the hexapod more expensive, more bulky and especially heavier. However, an increase in the size and/or weight of the hexapod runs counter to an improvement in the manoeuverability of a robot equipped with the hexapod and its ability to access zones that are difficult to access. Moreover, the weight of the hexapod also generates a shearing force and a moment that it is necessary to compensate for.

In addition, if it is the case of moving the top plate only in accordance with rotations Rx and Ry parallel to the bottom plate 102, an oversizing of the jacks is not useful since the objective of such oversizing is to compensate for the shearing force, which does not develop any work.

To remedy this, the present invention proposes to modify the known hexapod systems by integrating a mechanical structure conformed so as to absorb the shearing force T so as to relieve the linear actuators of this shearing force.

The linear actuators of arms may then manage rotation movements of the load M' with their entire capacity. This structure for absorbing the shearing force is preferably housed at the centre of the hexapod. It is secured to the fixed support and in swivel connection with the support to be moved with respect to the movable support. This articulation forms a swivel offering two degrees of freedom in rotation on the desired axes, that is to say on the axes Rx and Ry.

Figure 4:
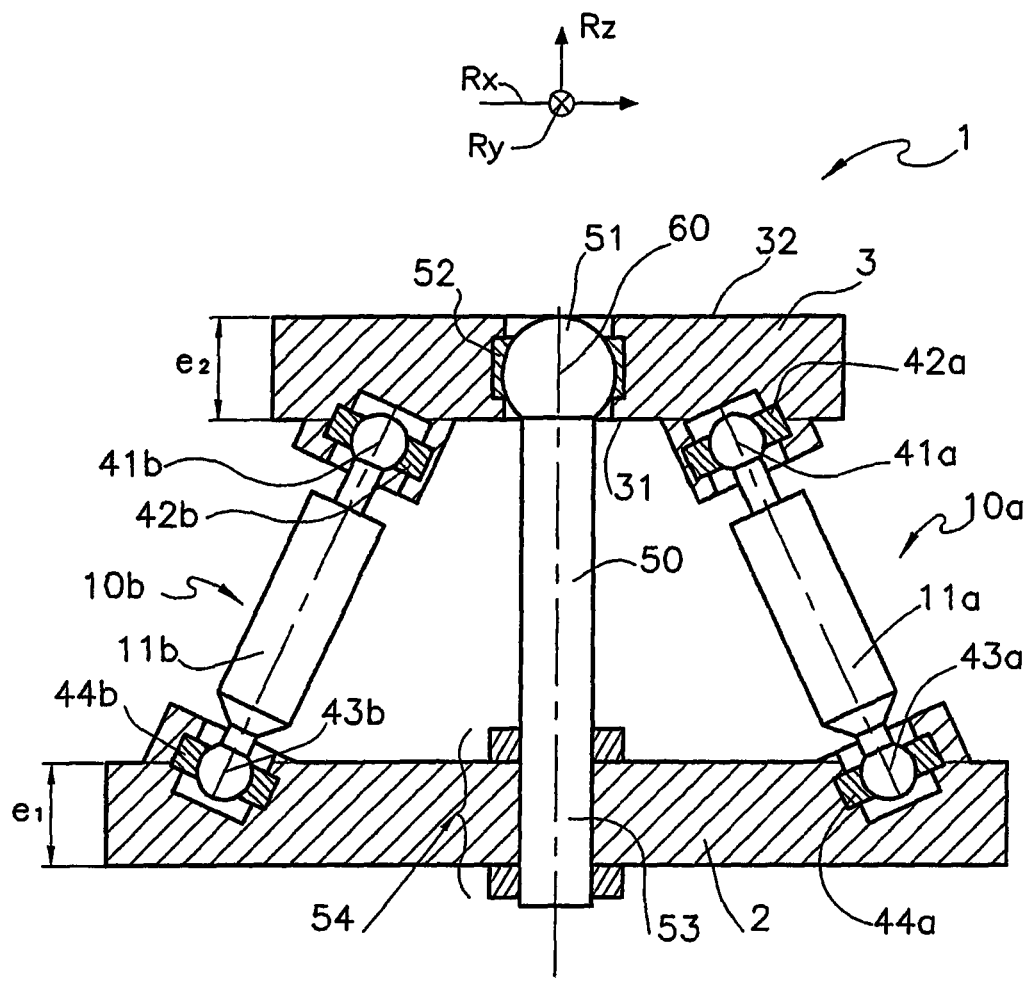
FIG. 4 is a diagram illustrating a first embodiment of the invention seen in cross-section.

Example embodiments of the invention will now be described in more detail respectively with reference to FIG. 3 and FIGS. 4 and 5.

FIG. 3 illustrates a first embodiment of a hexapod system according to the invention. This hexapod system, also referred to as a hexapod, comprises a first support 2 and a second support 3. The invention is not limited to any particular form of support. Thus, non-limitatively, each support may have a planar shape and constitute a plate.

Also non-limitatively, it will be considered in this description that the second support 3 must be rotated with respect to the first support 2. For this purpose, six linear actuators 10a, 10b, . . . 10f are each articulated by one of their ends on the first support 2 by a swivel connection 43a, 44a, . . . , 43f, 44f and articulated by one of their other ends on the second support 3 by means of another swivel connection 41a, 42a, . . . , 41f, 42f. Each swivel connection 41a, . . . , 41f, 43a, . . . , 43f cooperates with a seat 42a, . . . , 42f, 44a . . . , 44f carried by one of the two supports 2, 3.

These linear actuators 10a, . . . , 10f, also referred to as articulation arms, comprise for example hydraulic, pneumatic or screw jacks for example. These linear actuators 10a, . . . , 10f, are disposed in pairs so for example that the swivel connection of the actuator 10b is disposed on the first support 2 closer to the actuator 10a than the other actuators 10c, . . . , 10f and so that this actuator 10b is disposed on the second support 3 closer to the actuator 10c than the other linear actuators 10d, . . . , 10a. Thus this arrangement of the actuators avoids rubbing or jamming points on the mechanism.

The system also comprises a force-absorbing structure 50. This structure is embedded in the first support 2. It is coupled to the second support 3 by a swivel connection 51, 52. This force-absorbing structure 50 is rigid, that is to say it is conformed so as to transmit forces (along Rx, Ry and Rz) between the embedding 54 and the swivel connection 51, 52. Preferably, it does not comprise any articulation other than the swivel connection 51, 52.

According to an advantageous embodiment illustrated, this structure forms a connecting arm. One end 53 of the connecting arm cooperates with the first support 2 in order to form the embedding 54. The other end of the connecting arm forms a swivel 51 that cooperates with a seat 52 secured to the second support 3 in order to form a swivel connection 51, 52. Advantageously, the connecting arm forms a tube.

The second support 3 has at least two degrees of freedom in rotation about axes Rx and Ry illustrated in FIG. 3, the rotation axis Rz being the natural rotation axis of the second support 3. In the case where the force-absorbing structure is substantially linear, cylindrical or conical, the axis Rz is parallel to the principal direction along which this structure lies.

In a particular embodiment, the second support 3 can also turn with respect to the first support 2 on the axis Rz perpendicular to the axes Rx and Ry. This freedom in rotation on the axis Rz can for example serve to screw an element by means of a tool carried by the support.

Particularly advantageously, the centre 60 of the swivel connection 51, 52 is situated in the thickness $e_2$ of the second support 3. This thickness is illustrated in FIG. 4. For example, in the case of a second support 3 forming a plate having a bottom face 31 and a top face 32, the centre 60 is situated between these two faces 31, 32. More generally, the circumference of the second support 3 defines an envelope and the centre of rotation 60 fits inside this envelope. In other words, the centre of rotation 60 of the swivel connection 51, 52 is situated between two planes parallel to each other, parallel to the plane defined by the axes Rx and Ry, and passing through the second support 3.

Particularly advantageously, the centres of the swivels 41a, . . . , 41f, 43a, . . . , 43f are situated respectively in the thickness $e_2$ of the plate 3 and $e_1$ of the plate 2. The centres of the swivels 41a, . . . , 41f are coplanar and the centre 60 belongs to the plane containing the centres of the swivels 41a, . . . , 41f. This helps to reduce the forces exerted by the actuators 11a, . . . , 11f other than those necessary for moving the plate 3. The centres 43a, . . . , 43f are also coplanar.

Thus the invention eliminates or at the very least reduces the lever arm between the centre of rotation 60, the second support 3 and the centres of the swivels 41a, . . . , 41f, thereby limiting the shearing forces that have to be balanced by the actuators 11a, . . . , 11f to the detriment of the forces necessary for moving the second support 3. The force-absorbing structure 50 in particular absorbs the shearing force that would exert external force oriented non-perpendicularly to the first support 2 and exerted on the support 3. That is to say a force exerted non-perpendicularly to the plane defined by the axes Rx and Ry.

The size and weight of the system can then be reduced while keeping its load capacity in rotation on the axes Rx and Ry.

Preferably, the swivel connections 41, 42 of the linear actuators 10 with the second support 3 form a flat contour. The centre 60 of the swivel connection 51, 52 of the shearing-force absorbing structure 50 is situated so that a straight line perpendicular to said plane and passing through the centre 60 also passes inside said contour. Preferably, the centres of the swivels 41, 42 define a circle and the centre 60 situated at the middle of the circle or on a straight line perpendicular to the circle and passing through the centre of the circle. Thus the forces of the second support 3 are distributed evenly over the force-absorbing structure 50.

Preferably, the same applies to the embedded connection 54. It is preferably situated inside a circumference defined by the centre of the swivel connections 43, 44. Preferably, this circumference forms a circle and the embedding 54 is situated at the middle of this circle or on a straight line perpendicular to this circle and passing through its centre.

Figure 5:
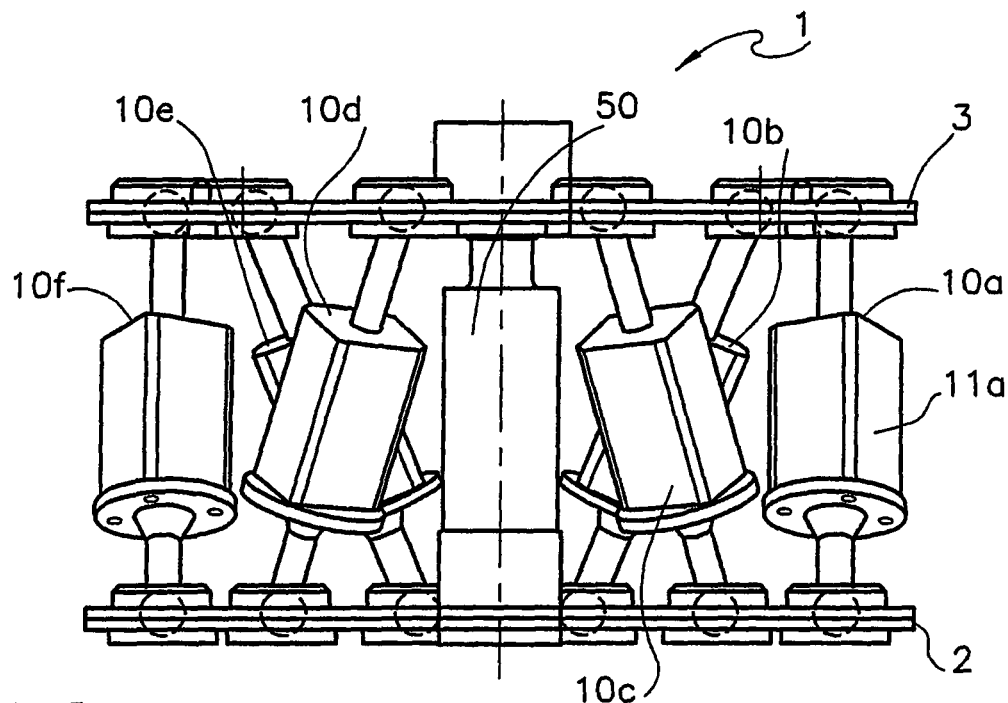
FIG. 5 illustrates a second embodiment of the invention seen from the side.
Figure 6:
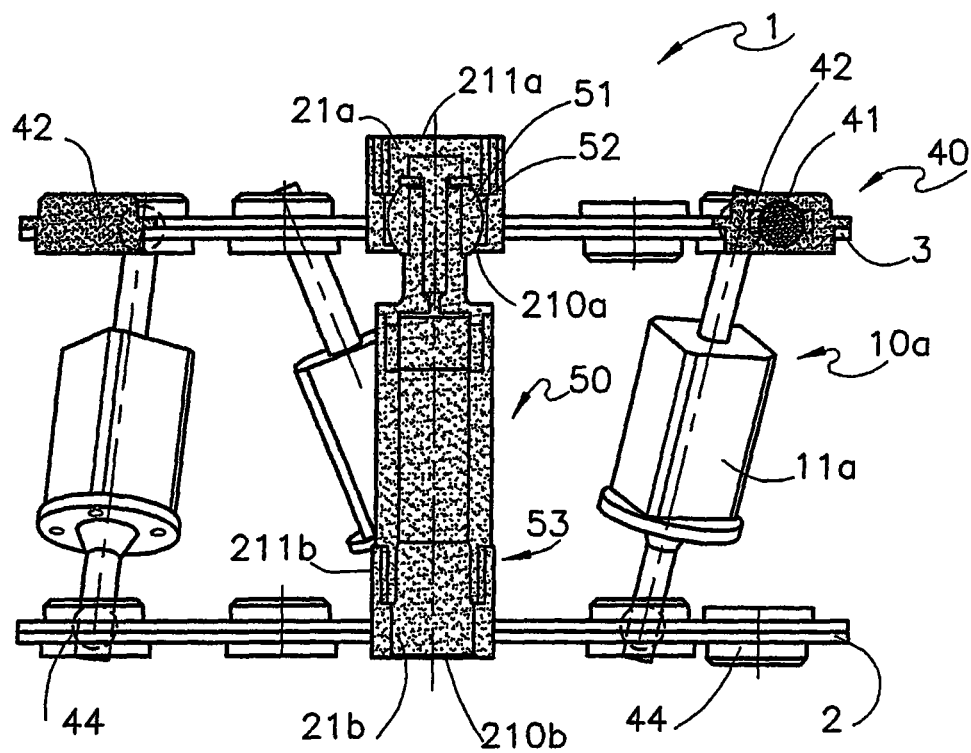
FIG. 6 is a cross-section of the second embodiment illustrated in FIG. 4.

The embodiment illustrated in FIGS. 5 and 6 repeats the features of the embodiment described above with reference to FIG. 4. In addition, in this embodiment, the centre of rotation 41 of the swivels articulating the linear actuators 10 on the second support 3 is moved closer to this second support 3. Preferably, the centre of rotation 41 is situated in the plane or in the thickness $e_2$ of the second support 3. This further reduces the lever arm between the swivel and the second support 3, thereby reducing the forces applied to this support 3 and to the linear actuators 10. The embedding and the weight of the system can then be reduced while preserving the rotation capacity on the axes Rx and Ry. Alternatively, this makes it possible to increase the load capacity of the system for equivalent weight and size. It should be noted that this feature can be applied independently of the presence of a structure for absorbing shearing forces.

Likewise, and preferably, the centre of rotation 43 of the swivels articulating the linear actuators 10 on the first support 2 is moved closer to this first support 2. Preferably, the centre of rotation 43 is situated in the plane or in the thickness $e_1$ of the first support 3. It should be noted that this feature can also be applied independently of the presence of a structure for absorbing shearing forces.

Preferably, each support 2, 3 is a metal plate, the thickness of which is relatively small compared with the height of the system, the height of the system being taken in the direction Rz. These metal plates may be provided with reinforcements increasing their rigidity along the axes Rx and Ry in order to limit their deformation under the action of the forces generated by the actuators, the force-absorbing structure and the external forces.

Preferably, the first and second supports 2, 3 are plates on which the seats 42, 44 of the swivel connections are attached in order to articulate the linear actuators 10. Manufacture of the system is thus facilitated thereby.

Preferably, the second support 3 comprises a connector 21a. This connector 21a comprises the seat 52 of the swivel connection 51, 52 articulating the force-absorbing structure 50 on the second support 3. Preferably, this connector 21a is also conformed so as to accept the end of another force-absorbing structure 50 in order to form with the latter an embedding. Thus the same connector can serve to form a swivel connection and to form an embedding. Thus the first and second supports 2, 3 may be similar, which facilitates the manufacture and cost thereof.

Advantageously, the first support 2 also comprises a connector 21b. Thus, before the system is assembled, the first and second supports 2, 3 are identical.

According to a particular embodiment, the connectors 21a, 21b are in the form of a sleeve having two ends. A first end 210a, 210b is configured so as to accept the seat 52 and the swivel 51 forming the swivel connection 51, 52 of the shearing-force absorbing structure 50. A second end 211a, 221b is configured so as to accept the end 53 of the structure 50 so as to form with the latter embedding. Typically, this embedding connection 54 is obtained by screwing the shearing-force absorbing structure 50 in the connector 21a, 21b. A pin can for example be provided to eliminate the remaining degree of freedom in rotation.

Advantageously, the same connector is configured so as to receive simultaneously a first structure 50 for forming a swivel connection and second structure 50 for forming an embedding connection. This embodiment is particularly advantageous if several hexapod systems are mounted in series.

Thus the same connector and the same support can be used for two hexapods mounted in series. Taking the example in FIG. 6, the connector 21a of the second support 3 can for example accept by its end 211a an additional structure 50, not shown, so as to form with the latter an embedding. By also mounting additional linear actuators above the second support 3 and coupling these additional linear actuators to a third support, not shown, in this way two hexapods mounted in series and having the second support 3 in common would be obtained. This embodiment is favoured.

Nevertheless, it should be noted that the invention also covers hexapods mounted in series but not having a connector able to receive a force-absorbing structure 50. It should also be noted that the invention covers hexapods mounted in series but not sharing a common support.

According to a preferred embodiment, a device is provided for controlling the linear actuators configured so as to prevent rotation of the second support 3 with respect to the first support 2 about the axis Rz.

Figure 7:
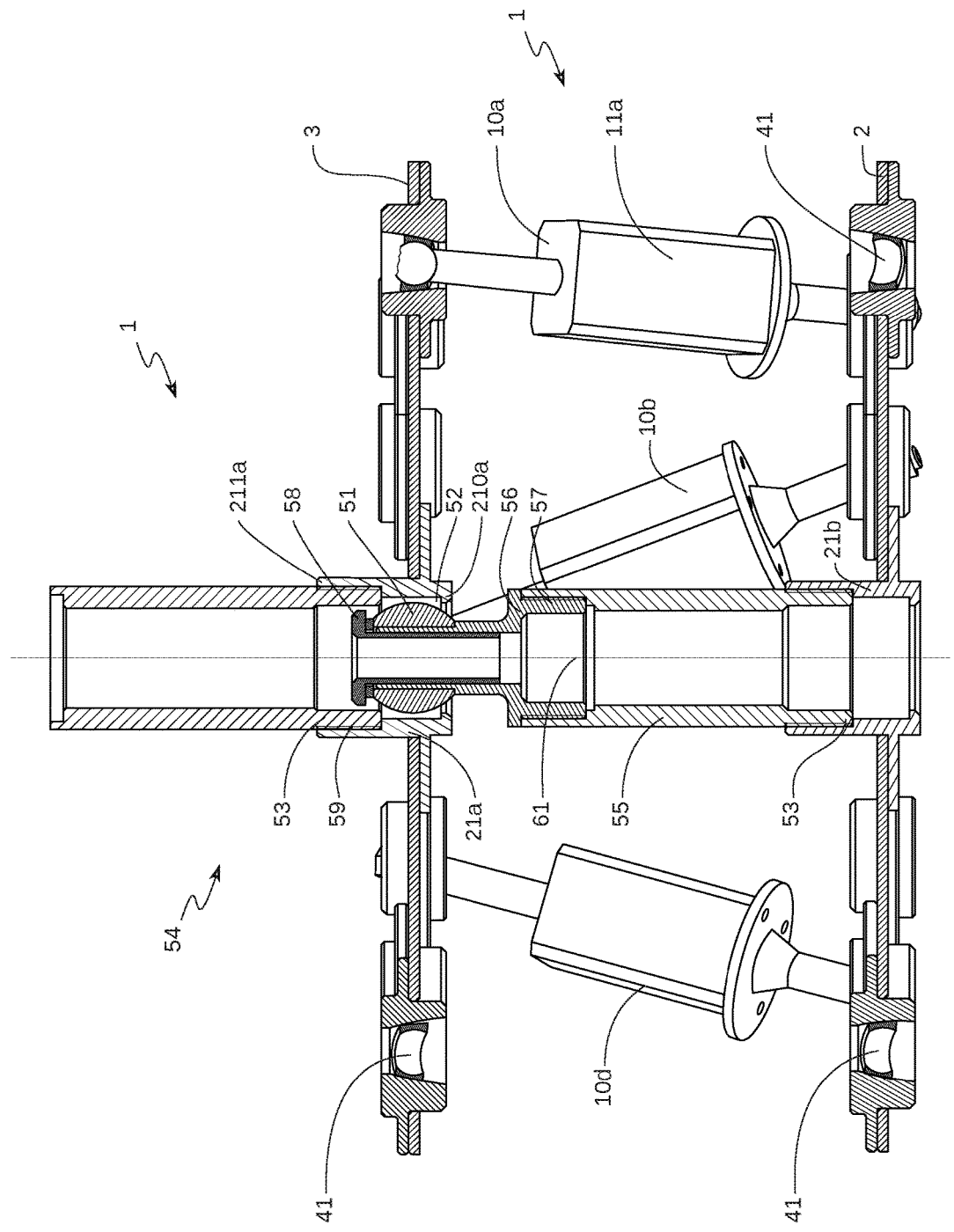
FIG. 7 illustrates an embodiment in which the force-absorbing structure is hollow.

FIG. 7 illustrates an optional but particularly advantageous embodiment. In this embodiment, the force-absorbing structure 50 is entirely hollow. Each hexapod system 1 thus has a passage channel 61. This lightens the whole of the articulation 1 and therefore lightens the polyarticulated arm and allows an increased load capacity for an equivalent weight. This also makes it possible to pass cables or pipes at the centre of the connection. Rotation of the articulation about the axis Rz, that is to say about the axis along which the force-absorbing structure mainly extends, thus does not cause twisting of the cables or pipes passing through it, even if these cables or pipes extend from one end to the other of the polyarticulated arm. Moreover, positioning the cables at the centre of the articulation avoids elongating them during movements of the articulation. These cables are for example electric cables, making it possible for example to control tools disposed on the arm or making it possible to communicate with sensors supported by the arm. Pipes can make it possible to control and actuate tools, for example pneumatic or hydraulic, disposed on the arm. These pipes can also make it possible to inject, take off or extract a fluid from the end of the arm.

According to the non-limitative embodiment illustrated in FIG. 7, the force-absorbing structure 50 is substantially similar to the one described with reference to FIGS. 5 and 6.

The connector 21a is hollow. It comprises a through internal bore.

The second end 211a of the connector comprises an internal thread 59 cooperating with an external thread situated on the external face of a first end 53 of the hollow tube 55 of the force-absorbing structure.

The first end 210a of the connector comprises a reduction in cross-section that prevents the swivel 51 from emerging from the bore formed by the connector.

The hollow tube 55 comprises a second end carrying on its internal face a thread 57 conformed so as to cooperate with a complementary thread carried by an external face of a part forming a swivel support 56 for the swivel 51. This swivel support 56 is thus fixed to the hollow tube 55 by screwing. This embodiment considerably simplifies the manufacture and assembly of the articulations.

The swivel support 56 comprises a portion for receiving the swivel 51. The swivel 51 forms mainly a sphere that comprises a bore complementary to this reception portion and is fitted on the latter from the end of this swivel support 56. A retention stop is also provided to prevent withdrawal of the swivel 51. This stop preferably comprises a screw having an external thread that cooperates with an internal thread carried by the bore of the support 56 for the swivel 51. Thus the screw is fixed to the end of the support 56 of the swivel 51. The screw head has a cross-section larger than the bore of the swivel 51. The latter thus abuts against the bottom face of the screw head. Preferably, a washer is provided between the screw head 58 and the swivel 51.

Particularly advantageously, the screw is hollow. The force-absorbing structure 50 comprising the two connectors 21a, 21b, the hollow tube 55, the support 56 for the swivel 51, the swivel 51 and the screw 58 therefore has a through opening forming a passage channel 61 for a cable or a pipe.

Advantageously, an articulation 1 is assembled as follows:
- fixing, preferably by screwing, the hollow tube 55 to the connector 21b secured to the support 2;
- fixing, preferably by screwing, the support 56 for the swivel 51 on the hollow tube 55;
- passing the support 56 for the swivel 51 through the connector 21a secured to the support 3;
- positioning the swivel 51 on the reception portion carried by the swivel support 56 and inside the seat 52 formed by the connector 21a;
- fixing, preferably by screwing, the retention stop, here the hollow screw 58 and the washer on the support 56 for the swivel 51.

The assembly of the arm can then continue with the assembly of a second articulation. For this purpose, the above steps are reiterated using the connector 21a of the support 3. The first step thus consists of fixing another hollow tube on the connector 21a.

Other embodiments can be envisaged for forming a channel passing through each of the articulations.

Figure 8:
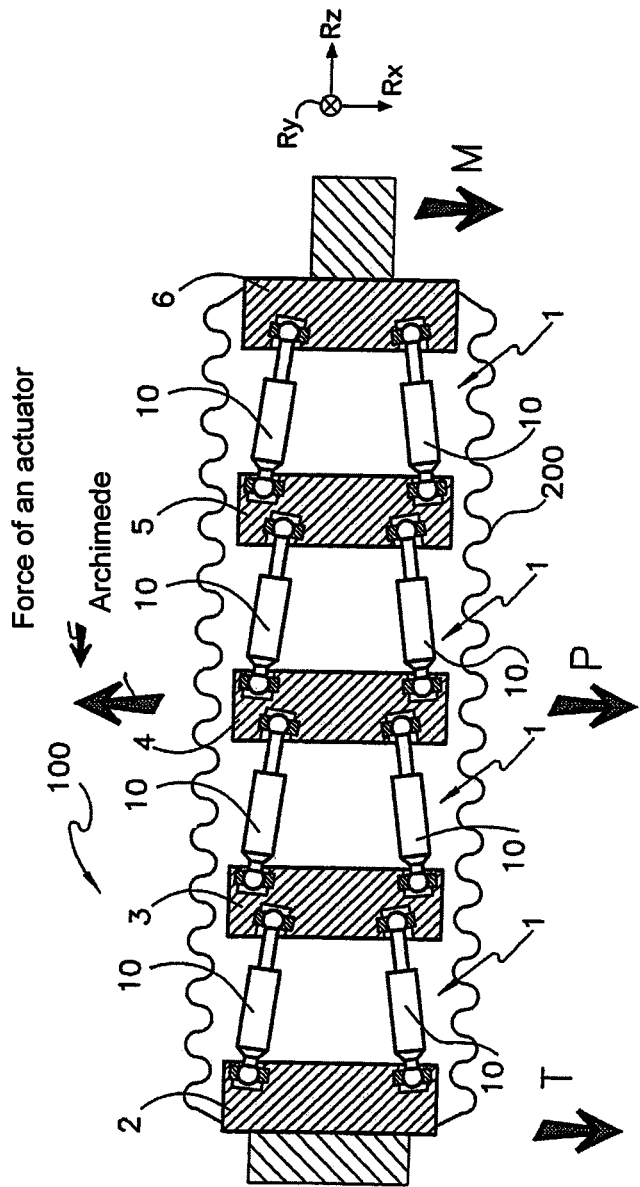
FIG. 8 illustrates schematically an example of a polyarticulated arm according to the invention that is equipped with a sheath.

Particularly advantageously, and as illustrated in FIG. 8, the polyarticulated arm 100 formed from several hexapod systems comprises a sheath 200 that forms a sleeve around the polyarticulated arm or at least around the hexapod systems.

This sheath is fluidtight. It is deformable and can follow the movements of the articulations. In the case of rotation about an axis Rx or Ry, the sheath 200 follows the form of the polyarticulated arm 100. It should be noted that, whatever the curvature of the arm 100, the centres of the radii of curvature of the articulations are situated outside it and usually outside the interior of the sheath 200. The deformation of the sheath is therefore distributed over a relatively large surface area of it. The zones stressed under deformation are therefore extended, which reduces the fatigue on the sheath 200. Its fluidtightness is therefore effective and durable.

The sheath 200 is therefore well suited for changing the position of the arm 100 in an environment where the articulations must be protected. Such is the case with a sodium-coolant reactor for example.

Preferably, the sheath 200 is fixed sealingly at one of its ends to the frame or to the support 2 secured to said frame, that is to say to the support for the proximal end of the arm 100. It is preferably fixed at its other end to the support 6 of the distal end of the arm 100 or to an element secured to this support 6.

Preferably, the sheath 200 has a continuous fluidtightness between its two ends. It may be in a single piece or formed by several parts assembled together sealingly.

Preferably, the sheath 200 has a constant volume or is slightly compressible. Thus it is deformable but not compressible or only slightly compressible under the effect of an external pressure. Subjected to a relatively strong surrounding pressure, typically between 1 and 10 bar, the sheath 200 keeps a substantially constant volume. More generally, subjected to a relatively high surrounding pressure, typically between 1 and 10 bar, the volume of the sheath 200 does not decrease by more than 10% and preferably does not decrease by more than 5%. Such an external pressure may for example be generated by a fluid in which the polyarticulated arm 100 is immersed. This is what may happen when the arm 100 performs an ISIR task in a sodium-coolant reactor.

The sheath 200 has a constant volume which prevents it from coming into contact with the linear actuators 10 under the effect of an external pressure. The risks of tearing are then avoided. Moreover, the sheath 200 increases the volume of the polyarticulated arm 100 and therefore increases the Archimede buoyancy exerted on the latter. The Archimede buoyancy is illustrated in FIG. 8. This Archimede buoyancy compensates for all or part of the weight of the polyarticulated arm 100. This is because the weight of the arm 100 itself has a tendency to be added to the load of the mass M carried by the distal end of the arm and/or by the force exerted by this end on an external element. The shearing force caused by the weight itself of the arm 100 therefore limits the load capacity of the latter. By virtue of the invention, the load capacity that can be deployed by the arm 100 is thus increased while compensating for all or part of the weight itself of the arm by means of the Archimede buoyancy.

This is particularly advantageous when the arm 100 has a high mass because of its length, the number of articulations that it comprises or the size of the latter.

This is particularly advantageous when the arm is deployed horizontally and/or works in a deployed position close to horizontal.

The fluid present inside the sheath 200 is lighter than the fluid of the medium surrounding the arm 100. Typically, gas will be favoured, for example air, when the polyarticulated arm 100 moves in a liquid. It will also be possible to provide a gas lighter than air, such as helium, when the arm 100 is moving in free air. This is all the more advantageous since the weight of the arm 100 causes a shearing force on the force-absorbing structure 50 when it not vertical. This weight and the shearing force that it causes are illustrated in FIG. 8.

Preferably, the sheath 200 is formed by a corrugated tube such as a bellows tube. Advantageously, it is formed by a corrugated tube made from metal, for example stainless steel. The choice of such a material makes it possible to withstand the pressure of the surrounding fluid, or even temperature and/or chemical stress when it is a case for example of a sodium coolant. The rigidity of the corrugated tube enables the sheath 200 to keep a volume enabling it to follow the movements imparted by the polyarticulated arm, even in the presence of external pressure.

According to another embodiment, the sheath 200 comprises a flexible fluidtight external envelope and a rigid framework on which the flexible envelope bears. The framework thus forms a support structure. It is for example made from metal. It can be attached to the polyarticulated arm 100.

According to another embodiment, the framework is formed by the supports 2, . . . , 6 of the articulations 1. The latter are therefore sized so as to keep the envelope at a distance from the linear actuators 10 and the swivels coupling the linear actuators to the supports.

According to yet another embodiment, a sheath is provided that is partly deformable but prevents a deformation that would give rise to the contact between the sheath and the actuators 10. Thus it would be possible to have a sheath formed by a flexible external envelope that can deform until it encounters a rigid framework preventing it from coming into contact with the linear actuators 10. Thus the risks of to tearing the sheath in contact with the linear actuators 10 are eliminated.

According to yet another embodiment, the arm is configured so as to maintain sufficient pressure inside the sheath 200 to maintain the volume of the latter. Thus it is possible to make provision for injecting a pressurised gas into the sheath so that the pressure inside the sheath 200 balances the action of the surrounding pressure on the sheath.

It is thus clear that the invention offers a robust solution for simply absorbing the shearing force in order to relieve the actuators. The invention also proposes an effective solution of the mechanised swivel type for moving a load or for exercising an action according to at least two degrees of freedom in rotation.

The invention thus proves to be particularly effective as a base element of a robot or of an articulated mechanism used in inspection or repair tasks in a constraining environment such as in nuclear reactors.

The invention is not limited to the embodiments described above and extends to all embodiments covered by the claims.

In particular, although it is particularly advantageous for inspection and repair tasks in a nuclear environment, the invention also applies to articulations from robots having other tasks or being intended to move in other environments.

The invention claimed is:

1. A hexapod system comprising:
a first support;
a second support;
six linear actuators; and
a first force-absorbing structure,
wherein each linear actuator has two ends, with one end of each linear actuator articulated in one of the first support and the second support by a swivel connection,
wherein the first force-absorbing structure comprises one end embedded in the first support and another end coupled to the second support by a swivel connection with a center of rotation situated in a thickness of the second support,
wherein the swivel connections by which the linear actuators are articulated on the first support each have a center of rotation situated within a thickness of the first support and the swivel connections by which the linear actuators are articulated on the second support have the center of rotation that is situated within the thickness of the second support,
wherein at least one of the first support and the second support comprises a connector configured to cooperate with the first force-absorbing structure,
wherein the first force-absorbing structure is configured to cooperate with a second force-absorbing structure of a second hexapod system, with the two hexapod systems mounted in series to form a swivel connection and respectively an embedded end, the same connector thus cooperating with the force-absorbing structures of two hexapod systems mounted in series, and
wherein the swivel connections by which the linear actuators are articulated on the second support are coplanar with the center of rotation of the swivel connection by which said force-absorbing structure is coupled to the second support.

2. The hexapod system according to claim 1, wherein the connector forms a single piece.

3. The hexapod system according to claim 1, wherein the force-absorbing structures of two hexapod systems mounted in series are secured to the supports solely by the connectors.

4. The hexapod system according to claim 1, wherein the support comprising the connector is common to the two hexapod systems mounted in series.

5. The hexapod system according to claim 1, wherein the actuators of the two hexapod systems are rotationally articulated on the common support.

6. The hexapod system according to claim 1, wherein the common support forms a single piece.

7. The hexapod system according to claim 1, wherein said center of rotation of the swivel connection of the force-absorbing structure is situated between two planes passing through the second support, said two planes being parallel to each other and perpendicular to an axis Rz that passes on the one end through the embedded end between the force-absorbing structure and the first support and another end passes through the center of the swivel connection coupling the force-absorbing structure to the second support.

8. The hexapod system according to claim 1, wherein the second support has an internal face turned towards the force-absorbing structure and an external face opposite to the internal face and wherein said center of rotation of the swivel connection of the force-absorbing structure is situated between the internal and external faces.

9. The hexapod system according to claim 1, wherein said center of rotation of the swivel connection formed by the second support and the force-absorbing structure is situated at the center of a circle formed by the swivel connections by which the linear actuators are articulated on the second support.

10. The hexapod system according to claim 1, wherein the force-absorbing structure is embedded in the first support at a center of a circle formed by the swivel connections by which the linear actuators are articulated on the first support.

11. The hexapod system according to claim 1, wherein at least one from among the first and second supports forms a plate.

12. The hexapod system according to claim 1, wherein the force-absorbing structure has a first end at which the force-absorbing structure is embedded in the first support and a second end at which the force-absorbing structure is coupled to the second support by a swivel connection and wherein the first and second ends of the force-absorbing structure are secured.

13. The hexapod system according to claim 1, comprising a single force-absorbing structure.

14. The hexapod system according to claim 1, wherein the force-absorbing structure comprises a hollow tube carrying a hollow swivel connection, wherein the connector is hollow at its center, the hexapod system being configured so as to arrange a passage channel passing through the force-absorbing structure and the first and second supports.

15. An inspection and/or repair robot, comprising a poly-articulated arm equipped with a plurality of hexapod systems according to claim 1 and wherein the hexapod systems are disposed in series.

16. The robot according to claim 15, further comprising a deformable fluid-tight sheath enveloping the hexapod systems and conformed so as to follow the movement of the poly-articulated arm and to be maintained at a distance from the linear actuators and the swivel connections whatever the movement of the poly-articulated arm.

17. The robot according to claim 16, configured so as to ensure a pressure suitable for maintaining the sheath at a distance from the linear actuators inside the sheath.

18. The robot according to claim 15, wherein each force-absorbing structure comprises a hollow tube carrying a hollow swivel connection,
wherein each connector is hollow at its center, each hexapod system being configured so as to arrange a passage channel,
wherein the passage channel is configured to accommodate at least one of a cable and a pipe passing through the plurality of hexapod systems, with the passage channel passing through the plurality of hexapod systems.

* * * * *